Aug. 30, 1960 J. FRANK 2,950,505
METHOD OF MOLDING A PLASTIC ARTICLE HAVING A
CELLULAR BODY AND A PROTECTIVE SKIN
Filed July 10, 1956 2 Sheets-Sheet 1

*INVENTOR.*
JACOB FRANK

BY
CORBETT, MAHONEY & MILLER.
ATTYS.

Aug. 30, 1960 J. FRANK 2,950,505
METHOD OF MOLDING A PLASTIC ARTICLE HAVING A
CELLULAR BODY AND A PROTECTIVE SKIN
Filed July 10, 1956 2 Sheets-Sheet 2

INVENTOR.
JACOB FRANK

BY
CORBETT, MAHONEY & MILLER,
ATTYS.

United States Patent Office 2,950,505
Patented Aug. 30, 1960

2,950,505

METHOD OF MOLDING A PLASTIC ARTICLE HAVING A CELLULAR BODY AND A PROTECTIVE SKIN

Jacob Frank, 18303 Muirland, Detroit, Mich.

Filed July 10, 1956, Ser. No. 596,909

3 Claims. (Cl. 18—59)

It has been found that expansible polystyrene molding material, after foaming under heat and pressure, provides an excellent low-temperature insulator. Because of its bulk and low density, due to its cellular nature, the molded object also is a good flotation material. However, although objects molded from expanded polystyrene are comparatively strong and can adequately resist bending and compressive forces, the surface thereof remains tender and frangible and can be damaged easily even when carefully handled. Also, the surface is not sufficiently attractive for some uses. To overcome the drawback of surface weakness and unsatisfactory appearance, many attempts have been made to provide a hard, durable, and attractive surface on a cellular body formed from expansible polystyrene. Coating materials such as paints and lacquers have been tried but they form only an extremely thin film with little protection. Separately molded shells, bonded to the foamed or cellular objects, would provide the hard and durable surface but the cost would be prohibitive and it would be difficult to provide the necessary bond between the shell and body. The same is true of vacuum-formed shells, due to the fact that too many steps are necessary to produce them in addition to the labor and difficulty of bonding the formed shell to the cellular body.

My invention overcomes these and other difficulties encountered in the prior art in connection with articles made of expanded polystyrene and the processes of making such articles.

One of the objects of my invention is to provide a method of molding an article having a body formed of an expanded polystyrene material so that it is cellular in nature and of a selected density and which has a continuous protective skin of selected thickness and hardness which is effectively adhered to the body by actual fusion of the two materials into an integral structure or by a physical bond between the two materials.

More specifically the object of my invention is to provide a molding process whereby an article of the type indicated above having a cellular body and a protective skin bonded thereto is formed by a single molding operation which develops and molds the cellular body of expanded polystyrene and simultaneously develops and molds the skin and causes it to adhere to the body either by fusion into an integral structure or by a physical bond, produced by molding one material into the other under pressure, the type of bond depending upon the nature of the skin-forming material used.

Various other objects will be apparent from the following description.

As indicated above, as the body material for an article made according to my invention, I employ expansible polystyrene. This material is used in the form of pellets which are readily available from commercial suppliers such as Dow Chemical and Koppers Company. These pellets are made by incorporating into the polymer a volatile solid or liquid material which has no solvating or other chemical reaction with the polystyrene, but which will volatilize at about the softening temperature of the polystyrene. Thus, when these pellets, of expansible polystyrene, are heated to temperatures ranging from 200° F. to 350° F., the polystyrene softens and becomes pliable while the volatilizing agent becomes a gas and expands the pellet to many times its original size and causes a spongy, or porous, or cellular structure to form within the enlarged particle. Expansible polystyrene pellets, having varying critical or expanding temperatures, depending on the grade or specification of the material, are available commercially. Modified polystyrene materials may also be used, that is, any material having a polystyrene base with additives to change certain physical or chemical properties without changing the basic nature of the polystyrene.

As the skin material I may use various thermoplastics which are compatible with the polystyrene, in which case there will be an actual fusion of the two materials during the molding operation, or materials which are non-compatible with the polystyrene but which have a molding temperature necessary to expand the polystyrene pellets so that although there will be no actual fusion of the two materials during the molding operation, the polystyrene pellets will be forced under expansion pressure into the skin material and there will be a physical bond between the two materials. Examples of materials which are compatible with the expansible polystyrene are polystyrene and modified polystyrenes. Examples of non-compatible skin materials are vinyls such as polyvinylchlorides, polyethylenes, cellulosics, the acrylics such as methyl methacrylate, and the like.

In producing the article according to my invention, I select a mold of suitable contour which is capable of being closed to resist expansion of the article-forming materials but in which provision is made for the escape of air and gases during the molding operation. The open mold is heated to a temperature considerably above the softening point of the thermoplastic material to be used for forming the skin of the article. A temperature of around 325° F. to 550° F. is usually satisfactory. When the mold has been heated to the desired temperature, the surfaces of the mold cavity, which are to be in contact with and form the finished surface of the skin on the article, are covered with finely divided particles of the skin-forming material. The heat from the mold will be absorbed by the particles so that they will soften sufficiently, without melting into a liquid, and will cling to the hot mold surface and to each other. These skin-forming particles are allowed to remain in contact with the hot mold surfaces a sufficient length of time to allow the heat of the mold to soak through several layers of the particles to cause the particles in these several layers to cling to each other and to the mold surfaces to form a single layer on the mold surfaces. The thickness of the built-up layer will depend upon the heat-soaking period and it will consist of individual particles which stick to each other at their points of contact and to the mold surfaces where they contact therewith but are not yet developed into a continuous smooth skin. At the conclusion of the heat-soaking period, the excess particles of the skin-forming material, that is, those particles which are in the layers sufficiently far away from the hot mold surfaces that they have not absorbed enough heat therefrom to become softened, are removed from the mold leaving a uniform deposit of selected thickness adhering to the mold surface.

Expansible polystyrene pellets or beads of a suitable grade are then placed in the mold which has the deposit of skin-forming particles adhering to the surfaces thereof to fill or partially fill it. Polystyrene pellets which are now commercially available expand within a temperature range of 200° F. to 350° F. The thermoplastic material selected for the skin-forming material must have a recognized molding temperature in substantially the same range as the expansion range of the polystyrene. Thus, if the grade of expansible polystyrene selected for the article has an expanding range of 230° F. to 250° F., the skin-forming material selected should have a recognized molding range of 230° F. to 260° F.

The mold is then closed and is clamped shut. It is heated to a temperature sufficient to develop in the skin-forming deposit its required molding temperature and in the expansible polystyrene pellet material its required expanding temperature. Usually it is sufficient for these purposes to heat the mold to a temperature of 250° F. to 350° F. When the mold is thus heated, the skin-forming material softens and the pellets of polystyrene expand. Due to the heat and pressure developed by this expansion the pellets tend to fuse together closing all the voids that had existed between the pellets forming a tightly-knit, cellular material. Furthermore, the expansion of the polystyrene pellets forces them against the softened skin material so that the skin is forced out under considerable pressure against the mold surfaces. Also, the pressure of the expanding pellets against the small softened particles of the skin material causes such particles to flow together into a completely homogeneous structure. Thus, the expansion of the polystyrene pellets not only produces the cellular body of the article but also provides the necessary pressure to develop the continuous skin on the article and to force the skin into firm contact with the mold surfaces to produce an extremely smooth continuous skin surface on the article. If the material selected for the skin of the finished article is chemically similar or compatible with the expanded polystyrene body material, these two materials will fuse or knit together forming an integral bond at the interface due to the heat and pressure developed during the molding operation. If the material selected for the skin is dissimilar or incompartible, no fusion at the interface will occur but there will be an effective physical bond due to the mechanical gripping action resulting from the expanded pellets of polystyrene being forced under considerable pressure into the softened skin material during the molding operation.

At the completion of the molding operation the mold is removed from the source of heat, and is cooled. It is then opened and the finished article consisting of a cellular body and a continuous protective skin is removed from the mold.

In the accompanying drawings, I have illustrated diagrammatically the succesive steps in producing an article according to my invention and have illustrated one form of article produced according to my invention.

Figure 1:
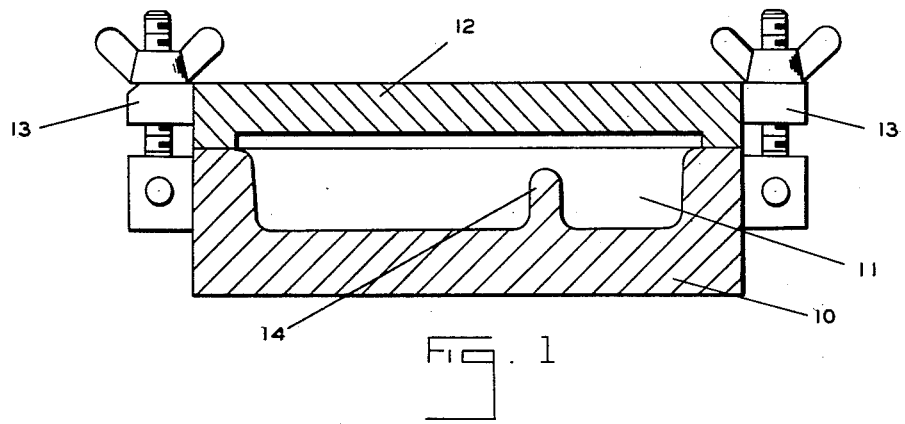
Figure 1 is a view illustrating a mold of a type which may be used in accordance with my invention.
Figure 8:
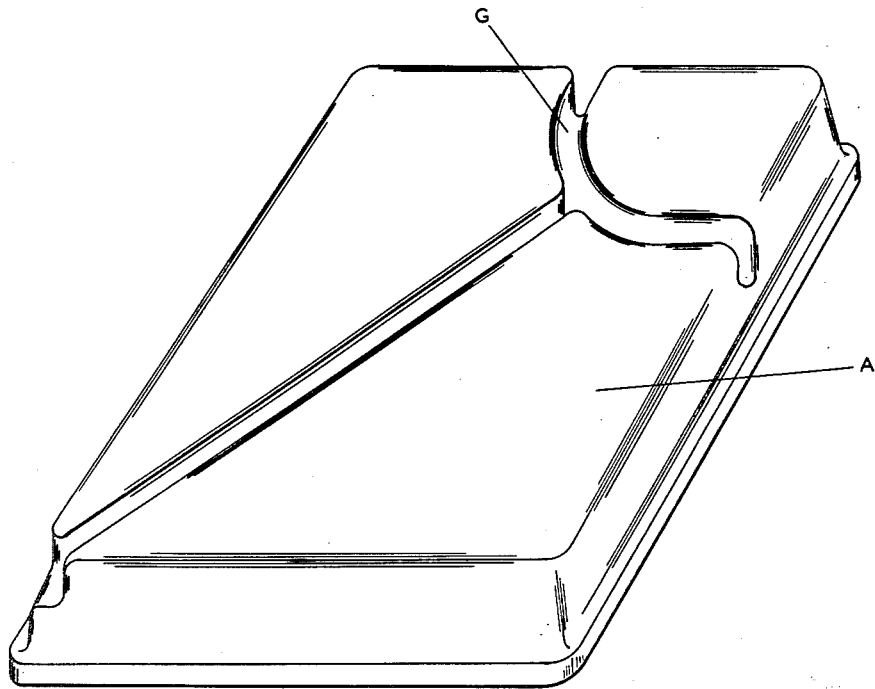
Figure 8 illustrates an example of an article in accordance with my invention.

With reference to the drawings, in Figure 1 I have illustrated schematically a mold of the type which may be used in forming the article according to my invention. This metal mold is illustrated as comprising a body 10 with a mold cavity 11 and a lid 12 which may be clamped tightly to the body by means of clamps 13. The clamps will serve to resist the molding pressure during molding of the article, keeping the article-forming materials within the mold cavity 11 but permitting the escape of air and gases developed during the molding operation. If desired, an actual vent (not shown) can be provided for this purpose. The cavity 11 will be a cavity negative to the shape of the finished article which is shown as a panel A in Figure 8 as an example of an article which can be produced according to my invention. It may include embossing or projections indicated by the numeral 14 which will produce intricate grooves G or configurations in the finished article. The mold must be of such a nature that it will permit repeated heating and cooling cycles through a range of from 70° F. to approximately 600° F.

The cavity surfaces of the metal mold are preferably first given a very light coating of a heat resistant lubricant such as silicone grease or other suitable mold release agents. Although this step is not absolutely necessary to the success of my process, it will usually aid in the removal of the molded part.

In Figures 2 to 7, I have illustrated successive steps in the molding of the article according to my invention. By this method, I accomplish in one molding operation the production of a plastic structure consisting of an expanded or blown polystyrene body B of controllable density having as its outer surface a thermoplastic skin S of controllable thickness and hardness as shown in section in Figure 7. In Figures 2 to 6, I illustrate a portion of a mold wall with certain materials in contact therewith and it is to be understood that this mold wall represents the entire mold cavity and the lid 12 if it is desired to have the skin completely enclose the body of the article. In some cases, however, it may be desirable not to have the skin on the side of the article which will be next to the lid and, in those cases, as will be apparent hereinafter, the skin-forming material will not be applied to the lid. Therefore, it should be understood that the mold wall portions represented in these figures may be the entire wall of the forming cavity or any selected portions thereof.

The mold body 10 and the lid 12 are heated by any suitable means such as an oven, electrical resistance heaters built into the mold, or a gas flame played over the mold. The heating is carried on until the temperature of the mold is approximately 325° F. to 550° F. Upon reaching the desired temperature, the surfaces of the mold cavity which are to be in contact with and form the surfaces of the finished article, are covered with finely divided particles of a material selected for the skin of the finished article. As previously indicated, this material will be a thermoplastic material selected because it has the desirable properties for the skin such as high impact resistance, transparency, translucency, or opacity, color, etc. This material must have a recognized molding temperature range which is substantially the same as the expansible polystyrene pellets to be used in association therewith. This material may be in the form of small particles such as minute beads or globules, fine powders, or fine granulations and may be of spherical, cubical or irregular shape but it is important that the particles be of a size sufficiently small to cling to the hot mold surface. The recommended particle size is 1/16 inch or less down to a finely divided flour.

Figure 2:
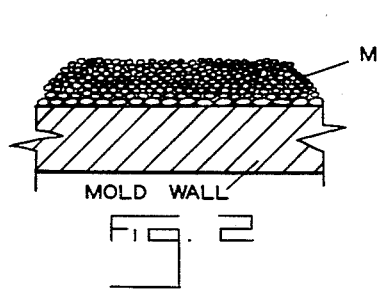
Figure 2 illustrates a portion of the mold wall having a mass of the fine skin-forming particles in contact therewith, the particles adjacent the mold wall being shown as they initially contact with the mold wall just as they start to absorb heat from the mold wall.
Figure 3:
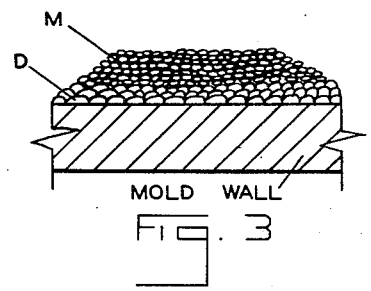
Figure 3 is a view similar to Figure 2 but showing the particles adjacent the mold wall after they have absorbed sufficient heat therefrom to soften sufficiently to cling to the wall and to each other.

In Figure 2, I illustrate the small particles of a skin-forming material in the form of globules or spheres in contact with the mold surface just as they start to absorb heat from the mold. The mass of these particles is indicated by the letter M. These particles which are shown as globules or spheres for illustration will become softened as soon as they contact with the mold surface as indicated in Figure 2. The particles in actual contact with the mold surface will be the first to absorb the heat therefrom and will soften and cling together as well as cling to the mold surface. This is illustrated by a flattening of those surfaces of the spherical particles in Figure 2 which have been softened and which contact with each other and with the mold surface. The length of time that these particles are in the heated mold, controls the thickness of the skin on the completed article since this heat-soaking period determines the thickness of the skin-forming deposit which will be built up on the mold wall. The particles themselves serve as an insulating medium so the thickness of the deposit will be proportional to the time of the soaking period and this deposit D will gradually build up during the soaking period as shown in Figure 3. It should be noted that this step in the process does not mold or finish the skin surface of the article but is merely a means of obtaining the proper amount of skin-forming material in the form of a deposit of proper thickness clinging to the mold surface. To completely mold and form this thermoplastic skin surface requires both heat and pressure. In this step of forming the deposit D, the temperature of the mold is not sufficiently high to permit absorption of a sufficient amount of heat to melt the deposit and there is no pressure on the deposit. Therefore, the individual particles of the skin-forming material are merely softened so that they stick to each other at the points of contact and to the mold surface where they contact therewith giving an incompletely formed skin surface which may be termed "granular" or "sandy" in nature on its exposed surface.

Figure 4:
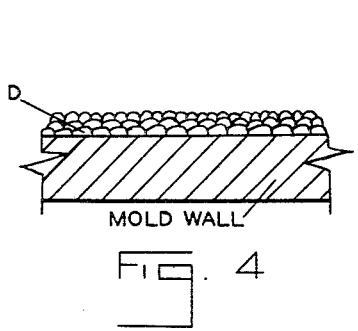
Figure 4 is a view similar to Figure 3 but showing the deposit of skin-forming particles adhering to the mold wall after the excess or unsoftened particles have been removed.

At the completion of the soaking period, which as previously indicated, can be varied to vary the thickness of the skin-forming deposit, the excess particles of the skin-forming mass M of material are removed or dumped out of the mold surface leaving a uniform deposit D of particles adhering to the mold surface as shown in Figure 4.

The next step is to fill or partially fill the mold cavity with expansible polystyrene pellets. The mass of pellets are indicated by the letter P in Figure 5 which shows the pellets in contact with the deposit D of skin-forming material which adheres to the mold surface. As previously indicated, expansible polystyrene pellets are available from commercial suppliers and the most common expand within a temperature range of 230° F. to 350° F. The expansible polystyrene beads or pellets usually are supplied in non-expanded form and, therefore, it is desirable to partially expand the pellets before depositing them in the mold. Therefore, in a pre-expansion operation, the pellets may be placed in a suitable oven or other suitable heating device so that they are pre-expanded to about 50% to 75% of their ultimate maximum size. This pre-expansion is desirable so that the beads or pellets in the pre-expansion operation can be supported in a single layer and expanded uniformly and to prevent the pushing of the expanding pellets through the skin deposit which might occur if complete expansion was carried out in one operation in the mold. However, depending upon the type of material used as the skin-forming material, complete expansion might be carried out in the mold. The degree of pre-expansion is controlled by the length of time the pellets are exposed to the source of heat. The temperature developed by the heating means for pre-expansion should be about 300° F. to 350° F. The degree of pre-expansion also controls the density of the cellular body of the finished article. For example, if the particles are pre-expanded to only 50% of their ultimate maximum size, an article will be produced having a much denser body than one produced from pellets which are pre-expanded to 75% to 80% of their possible maximum size.

Figure 5:
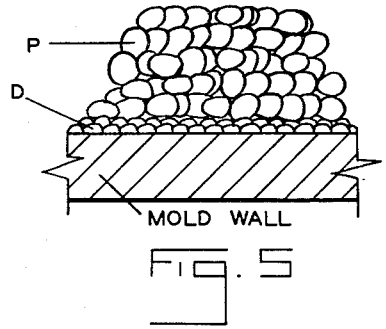
Figure 5 shows the mold wall with the adhering skin-forming deposit of Figure 3 thereon and shows a mass of expansible polystyrene beads or pellets in contact with such deposit.
Figure 6:
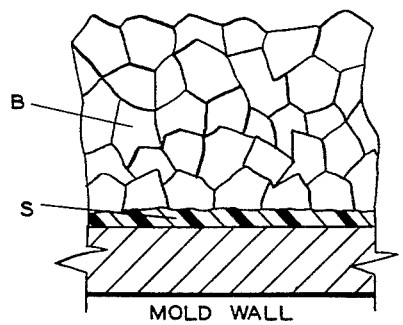
Figure 6 is a view similar to Figure 5 but illustrating the condition of the material in the mold after it has been heated sufficiently to expand the polystyrene pellets and to develop and mold the skin.

After the pre-expanded polystyrene pellets are placed in the mold cavity, the mold is clamped shut. The pellets P adjacent the deposit D will contact therewith as shown in Figure 5. The mold is then heated by a suitable heating device such as an oven or heated platen press to develop in the materials within the mold heat sufficient to soften the skin material and to further expand the polystyrene pellets. This temperature should be approximately 300° F. to 350° F. to develop the required temperatures in the materials in the mold. The expansible polystyrene, when thus heated, resumes its expanding action and, due to the heat and pressure developed by the expansion, the pellets tend to fuse together, closing all the voids that had existed between the pellets at the time they were deposited in the mold cavity. Thus, the gases or blowing agents in the expansible polystyrene cause the formation of a tightly knit cellular body B which presses against the skin-forming deposit D and forces it against the confining walls of the mold as illustrated in Figure 6. Furthermore, the resumed expansion of these pellets or beads forcing them against the skin material deposit not only forces this deposit out against the mold surface but the pressure of the expanding beads against the small softened particles of the skin material deposit causes these small particles to flow together into a completely homogeneous skin S as shown in Figure 6. At temperatures of 300° F. to 350° F. the thermoplastic layer of the skin-forming material is soft and pliable and is molded under the pressure exerted by the foaming or expanding action of the polystyrene material. The temperature of the expanding polystyrene pellets during the molding cycle may be slightly less than the temperature of the skin-forming material because the latter material will serve as an insulating medium between the mold wall and the body-forming material.

Where the material selected for forming the skin of the finished article is similar or compatible with the expanded polystyrene body, these two materials will fuse or knit together forming a tight bond at the interface due to the heat and pressure developed during the expansion of the polystyrene pellets. As previously indicated, I may use polystyrene resins or modified polystyrene resins when it is desired that the skin be fused to and form an integral part of the body. The following are specific examples of the use of this type of skin-forming material in my process in producing my article.

*Example 1*

A square aluminum mold, having an inside dimension of 4" x 4" x 1.5", a wall thickness of 1/4" and as a cover a flat lid, 1/4" thick, was heated to a temperature of 500° F. and completely filled with a clear polystyrene molding powder such as Koppers' Dylene 7 in the shape of very minute globules or beads. The excess of this material which had a molding temperature of 265°–310° F. was removed after 10 seconds, leaving a deposit in the mold.

18.5 grams of pre-expanded polystyrene beads, such as Dow's Q865.2 capable of taking expanding temperatures up to 350° F., was put in the mold and the lid, coated with a mold release agent, was clamped on. The closed mold was then heated in an oven at 300° F. for 20 minutes and then chilled 4 minutes in cold water.

The molded part had hard, clear polystyrene skin on all sides except top which had the foam exposed. The thickness of the skin was approximately 1/32".

*Example 2*

The mold and lid (as in Example 1) were heated to a temperature of 500° F. The mold was completely filled with polystyrene molding powder such as Koppers' Dylene 7. The excess material was removed after 10 seconds, leaving a deposit in the cavity and on the lid.

18.5 grams of pre-expanded polystyrene beads (as in Example 1) were put in the mold and the lid was clamped on. The closed mold was heated in an oven at 300° F. for 20 minutes, then chilled in cold water for 4 minutes.

The molded part had a hard, clear polystyrene skin on all six sides with a thickness of approximately 1/32".

*Example 3*

The mold (as in Examples 1 and 2) was heated to a temperature of 500° F. and completely filled with clear polystyrene molding powder such as Koppers' Dylene 7. The excess material was removed after 30 seconds, leaving a deposit in the cavity.

18.5 grams of pre-expanded polystyrene beads (as in Examples 1 and 2) were put into the mold and the lid, coated with a mold release agent, was clamped on. The closed mold was heated in an oven of 300° F. for 20 minutes, then chilled in cold water for 4 minutes.

The molded part had a clear, hard skin on all sides except the top which had the foam exposed. Thickness of the skin was approximately 1/16".

*Example 4*

The mold (as in Examples 1 to 3) was heated to a temperature of 550° F. and completely filled with a clear polystyrene molding powder such as Koppers' Dylene 8, similar in appearance to Dylene 7, but having a molding temperature of 315°–360° F. The excess material was removed after 20 seconds, leaving a deposit in the cavity. 21 grams of pre-expanded polystyrene beads (as in Examples 1 to 3) was put in the mold and lid, coated with a mold release agent, was clamped on.

The closed mold was heated in an oven of 350° F. for 15 minutes and then chilled in cold water for 4 minutes.

The molded part had a hard, clear polystyrene skin on all sides except the top which had the foam exposed. The thickness of the skin was approximately .045".

*Example 5*

One batch of polystyrene molding powder such as Koppers' Dylene 8, was colored white in a porcelain mortar by grinding titanium dioxide in it. Another batch was colored black by the same method, using carbon black pigment.

The mold (as in Examples 1 to 4) and the lid were heated to a temperature of 550° F. and the cavity was filled with the white molding powder. The entire surface of the lid was covered with black molding powder. The excess material was removed after 20 seconds, leaving a deposit. 24 grams of pre-expanded polystyrene beads (as in examples 1 to 4) were put in the mold and the lid was clamped on. The closed mold was heated in an oven at 325° F. for 20 minutes and then chilled 4 minutes in cold water.

The molded part had a hard, white opaque skin on five sides and a hard black opaque skin on top.

*Example 6*

The mold (as in Examples 1 to 5) was heated to a temperature of 500° F. and completely filled with polystyrene molding powder such as Koppers' Dylene 7. The excess material was removed after 20 seconds, leaving a deposit.

24 grams of pre-expanded polystyrene beads, such as Koppers' Dylite, capable of taking temperatures up to 290° F., were put into mold and the lid, perforated with several tiny holes and coated with a release agent, was clamped on. The closed mold was heated in a steam chest at 280° F. for 90 seconds and then chilled for five minutes in cold water.

The molded part had a hard, clear polystyrene skin on all sides except the top which had the foam exposed.

Where the material selected for forming the skin of the finished article is dissimilar or incompatible with the expanded polystyrene body, there will be a physical bond between the expanded pellets and the skin-forming material due to the fact that a mechanical gripping action is developed between the two materials because of the irregularities in the surfaces at the interface brought about by the expanded pellets being forced into the softened skin-forming material. As previously indicated, vinyls such as polyvinylchlorides, polyethylenes, cellulosics and the acrylics may be used for this type of skin-forming material. The following are specific examples of the use of this type of material to form the skin of the article produced by my process:

*Example 7*

The mold (as in examples 1 to 6) was heated to 525° F. and completely filled with methyl methacrylate molding powder, similar in appearance to Dylene 7 and Dylene 8. The excess material was removed after 15 seconds, leaving a deposit.

19 grams of pre-expanded polystyrene beads (as in examples 1 to 5) were put into the mold and the lid, coated with a mold release agent, was clamped on. The closed mold was heated in an oven at 300° F. for 20 minutes and then chilled for 4 minutes in cold water.

The molded part had a clear, hard skin of methyl methacrylate on all sides except the top which had the foam exposed.

*Example 8*

The mold (as in Examples 1 to 7) and the lid were heated to a temperature of 525° F. The mold was completely filled with a finely powdered, flour-like polyethylene molding powder such as Du Pont's Alathon G and the entire surface of the lid was covered with the same material. The excess material was removed after 25 seconds, leaving a uniform deposit.

18.0 grams of pre-expanded polystyrene beads (as in Examples 1 to 5) were put into the mold and the lid clamped on. The closed mold was heated in an oven at 300° F. for 20 minutes and then chilled for 4 minutes in cold water.

The molded part had a transparent, soft skin of polyethylene on all six sides.

*Example 9*

The mold (as in Examples 1 to 8) and the lid were heated to a temperature of 550° F. The mold was completely filled with a very finely granulated cellulose acetate butyrate molding powder and the entire surface of the lid was covered with the same material. The excess material was removed after 20 seconds leaving a uniform deposit.

23.0 grams of pre-expanded polystyrene beads (as in Examples 1 to 5) were put into the mold and the lid was clamped on. The closed mold was put into an oven of 350° F. for 15 minutes and then chilled in cold water for 4 minutes.

The molded part had a hard cellulose acetate butyrate skin on all six sides.

The material selected for one section of the skin may be compatible with the body and that selected for a different section of the skin may be non-compatible with the body and the following is an example:

*Example 10*

The mold (as in Examples 1 to 9) and the lid were heated to a temperature of 525° F. The mold was completely filled with polystyrene molding powder Dylene 7 and the entire surface of the lid was covered with polyethylene molding powder as in Example 8. The excess materials were removed after 25 seconds, leaving uniform deposits.

18.5 grams of pre-expanded polystyrene beads (as in Examples 1 to 5) were put into the mold and the lid was clamped on. The closed mold was heated in an oven at 300° F. for 20 minutes and then chilled in cold water for 4 minutes.

The molded part had a hard polystyrene skin on five sides and a soft polyethylene skin on top.

Figure 7:
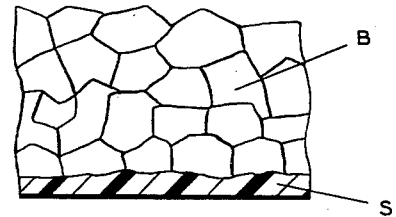
Figure 7 illustrates a section of the completed article after it has been removed from the mold.

At the completion of the molding operation, the mold is removed from the source of heat and cooled to a temperature ranging from 70° F. to 100° F. The mold is opened and the finished article is removed from the mold cavity. This article is indicated by the letter A in Figure 8 and is shown as being a panel. A section of the article is indicated in Figure 7 and it will be noted that it consists of a body B of cellular form and a protective skin S which is continuous and which is either an integral part of the body or is bonded thereto mechanically depending upon the type of skin-forming material used as indicated above.

It will be apparent that according to my invention an article having a cellular body B and a protective skin S bonded thereto is formed by a single molding operation wherein the pressure for developing and forming the skin on the article is provided by the expansion of the polystyrene body material. The thickness of the final skin on the article is determined by the soaking period in causing the skin-forming particles to adhere to the mold surfaces. The density of the cellular body is determined by the amount of pre-expansion of the polystyrene pellets and the amount of these pellets which are placed in the mold. The type of bond between the body and the skin is determined by the nature of the skin-forming material used.

Any intricate shapes can be formed by my process since the expanding polystyrene material will force the skin-forming deposit into firm contact with grooves or embossings in the mold cavity. For example, as indicated in the drawings, the rib 14 on the mold in Figure 1 will produce the groove G in the finished article in Figure 8.

The type of article produced according to my invention will be light in weight and will have good insulating properties. The selection of materials for the body and the skin may depend upon the type of body desired or the type of skin desired in the finished article or both. However, the materials selected must be such that the molding temperature range of the skin-forming material and the expanding temperature range of the body-forming material are substantially the same. The skin material may be translucent, transparent or opaque and may be colored or not as desired. If the skin is transparent, the body may be of a selected color the same or different from the skin. Different effects can also be obtained by varying the thickness of the skin. An excellent high-impact resistance surface can be provided by the skin. Molding can be effected around inserts without excessive tooling expenses and with liberal tolerances on insert dimensions since the molding pressure is developed within the article body by the expanded polystyrene.

Examples of uses of materials or articles produced according to my invention are refrigerator doors, baffles, and cabinets; wall paneling; pipe insulation; table tops; ice buckets; etc.

Various other advantages will be apparent.

Having thus described my invention, what I claim is:

1. A method for forming a molded plastic article having a molded skin and a cellular body, comprising the steps of depositing a thin, unmolded layer of particles formed of a thermoplastic, non-expansible, plastic, on the wall of a pre-heated mold, which mold is pre-heated to a temperature sufficient to cause the particles to soften slightly and to adhere to the wall and to each other to form a skin of loosely adhered, particles, the skin at this point containing voids between the particles and being non-homogeneous and non-unitary in mass; next placing a sufficient quantity of a thermally expansible plastic material into the mold to partially fill the mold and then closing off the space within which the expansible material may expand away from said skin layer; then heating the mold to expand said expansible material into a greatly enlarged cellular mass and to simultaneously mold the skin by heat and by the pressure of the expanding cellular material which pressure squeezes the skin layer against the mold wall to mold the skin into a coherent, unified, homogeneous mass of substantially uniform thickness and to join the expanded cellular material to the skin.

2. A method for forming a molded plastic article having a molded skin and a cellular body in a mold having a mold wall arranged in more than one plane, comprising the steps of depositing a thin layer of substantially uniform thickness, of unmolded particles formed of a thermoplastic, heat and pressure moldable plastic on the mold wall, the mold wall having been pre-heated to a temperature sufficient to soften the particles to the point where they adhere to the wall and to each other to thus form a skin of loosely adhered particles, which skin is non-homogeneous, and non-unitary in mass, and contains voids between the particles; next placing a sufficient quantity of a thermally expansible plastic material into the mold to partially fill the mold and then closing off the mold to limit the space within which the expansible material may expand away from the skin layer; then applying heat to the expansible material to thus expand it into a greatly enlarged cellular mass and simultaneously molding the skin by the applied heat and by the pressure of the expanding cellular material which pressure forces the skin layer against the mold wall to thus mold the skin into a coherent, unified, void-free, homogeneous mass of substantially uniform thickness and to join the expanded cellular material to the molded skin.

3. A method for forming a molded plastic article having a molded outer skin, a molded inner skin spaced from the outer skin and a cellular body arranged between and joined to the skins and filling the space between them in a mold having two spaced apart and opposing wall portions upon which the two skins may be molded, comprising the steps of depositing a thin layer of substantially uniform thickness, of unmolded particles formed of a thermoplastic, heat and pressure moldable plastic on each of the two mold wall portions, the mold wall portions having been pre-heated to a temperature sufficient to soften the particles to the point where they adhere to their respective wall portions and to each other to thus form a skin of loosely adhered particles on each wall portion, the skins each being non-homogeneous and non-unitary in mass and having voids between the particles next placing a sufficient quantity of a thermally expansible plastic material into the mold to partially fill the mold between the two wall portions and then closing off the mold to limit the space within which the expansible material may expand away from the two skin layers; then applying heat to the expansible material to thus expand it into a greatly enlarged mass and simultaneously mold both skins by the applied heat and by the pressure of the expanding cellular material, which pressure forces the two skin layers against their respective mold wall portions and thus simultaneously molds each of the skins into a coherent, unified, void-free, homogeneous mass of substantially uniform thickness and to join the expanded cellular body to both of the skins.

References Cited in the file of this patent

UNITED STATES PATENTS

| | | |
|---|---|---|
| 2,377,846 | Dreyfus | June 5, 1945 |
| 2,526,311 | Wilson | Oct. 17, 1950 |
| 2,706,311 | Drust | Apr. 19, 1955 |
| 2,714,747 | Lindemann et al. | Aug. 9, 1955 |
| 2,736,925 | Heisler et al. | Mar. 6, 1956 |
| 2,753,642 | Sullivan | July 10, 1956 |
| 2,787,809 | Stastny | Apr. 9, 1957 |
| 2,802,766 | Leverenz | Aug. 13, 1957 |

FOREIGN PATENTS

| | | |
|---|---|---|
| 523,547 | Belgium | Oct. 31, 1953 |
| 585,395 | Great Britain | Feb. 6, 1947 |